United States Patent
Noe et al.

(10) Patent No.: US 8,893,381 B2
(45) Date of Patent: Nov. 25, 2014

(54) ROTOR SEAL WIRE GROOVE REPAIR

(75) Inventors: Daniel David Noe, Cincinnati, OH (US); Douglas Jerome Jones, Cincinnati, OH (US); Michael Alan Pierson, Mason, OH (US)

(73) Assignee: General Electric Company, Schenectady, NY (US)

( * ) Notice: Subject to any disclaimer, the term of this patent is extended or adjusted under 35 U.S.C. 154(b) by 328 days.

(21) Appl. No.: 13/334,746

(22) Filed: Dec. 22, 2011

(65) Prior Publication Data

US 2013/0042474 A1 Feb. 21, 2013

Related U.S. Application Data

(60) Provisional application No. 61/524,376, filed on Aug. 17, 2011.

(51) Int. Cl.

| | | |
|---|---|---|
| B23P 6/00 | (2006.01) |
| F01D 11/00 | (2006.01) |
| F01D 5/06 | (2006.01) |
| F16J 15/06 | (2006.01) |
| B23P 15/02 | (2006.01) |
| F01D 5/00 | (2006.01) |
| F16J 15/00 | (2006.01) |
| F01D 5/30 | (2006.01) |

(52) U.S. Cl.
CPC ........... *F01D 11/006* (2013.01); *F05B 2230/90* (2013.01); *F01D 11/005* (2013.01); *F01D 5/06* (2013.01); *F01D 5/3038* (2013.01); *F05D 2230/90* (2013.01); *F16J 15/062* (2013.01); *F05B 2230/10* (2013.01); *F01D 11/00* (2013.01); *B23P 15/02* (2013.01); *B23P 6/002* (2013.01); *F05D 2230/10* (2013.01); *F01D 5/005* (2013.01); *F16J 15/00* (2013.01); *B23P 6/00* (2013.01)
USPC ........ 29/889.1; 29/889; 29/889.2; 29/889.23; 228/119

(58) Field of Classification Search
CPC .................................. B23P 6/002; B23P 6/007
USPC .......... 29/889, 889.1, 889.2, 889.23; 148/328; 228/119; 702/35
See application file for complete search history.

(56) References Cited

U.S. PATENT DOCUMENTS 4,924,581 A 5/1990 Jakobsen
(Continued)

FOREIGN PATENT DOCUMENTS

| GB | 2476551 A | 6/2011 |
| WO | 96/05331 A1 | 2/1996 |
| WO | 2011/035772 A1 | 3/2011 |

OTHER PUBLICATIONS

PCT Search Report and Written Opinion dated Oct. 24, 2012 from corresponding Application No. PCT/US2012/049686.

*Primary Examiner* — Richard Chang
(74) *Attorney, Agent, or Firm* — General Electric Company; Pamela A. Kachur (57) ABSTRACT

A method of repairing a seal wire groove is disclosed, the groove forming an annular structure having an outer surface and an inner surface and defining an original profile when new, comprising the steps of: removing a less-than-annular portion of the original profile of the groove to remove damaged portions of at least one of the inner and outer surfaces thereby forming a void; adding new material to the void; and shaping the new material to form a new profile of the groove.

20 Claims, 7 Drawing Sheets

(56) References Cited

U.S. PATENT DOCUMENTS

| | | | |
|---|---|---|---|
| 5,280,849 A * | 1/1994 | Galanes | 228/119 |
| 5,478,417 A * | 12/1995 | Heck et al. | 148/328 |
| 5,732,467 A * | 3/1998 | White et al. | 29/889.1 |
| 7,162,373 B1 * | 1/2007 | Kadioglu et al. | 702/35 |

* cited by examiner

ROTOR SEAL WIRE GROOVE REPAIR

CROSS-REFERENCE TO RELATED APPLICATION

This application claims priority to U.S. Provisional Application Ser. No. 61/524376, filed Aug. 17, 2011, the disclosure of which is hereby incorporated in its entirety by reference herein.

BACKGROUND OF THE INVENTION

The technology described herein relates generally restoration of grooves used in conjunction with seal wire, particularly to methods of restoring the profile of such grooves, and more particularly, to thermal spray techniques for such restorations.

Many gas turbine engine assemblies include a seal between adjacent surfaces of moving and non-moving parts, such as a rotating disk and a stationary structure, or between parts which have clearances between their mating surfaces. One common construction for such seals utilizes a seal wire formed of one or more segments which is inserted into a groove in one part and biased against the opposing part in sealing engagement.

During operation, the constant contact between the seal wire and the mating surface results in wear of the seal wire and/or movement of the seal wire within its groove. Since the seal wires are typically fashioned from one or more segments, with abutting ends located at one or more locations around their circumference. movement of the seal wire within the groove may result in fretting and/or other wear of the groove resulting from the motion of the seal wire ends. Over time this fretting or wear of the groove enlarges the groove and reduces the effectiveness of the seal wire arrangement, During repair and overhaul operations it is desirable to restore the seal wire and groove assembly to original or other suitable dimensions and tolerances. However, due to limitations of current repair methods it is frequently necessary to scrap and replace the rotor assembly with a new one having the proper groove dimensions. There remains a need for a repair method which will restore the groove geometry in a durable and economical fashion.

BRIEF SUMMARY OF THE INVENTION

In one aspect, a method of repairing a seal wire groove, the groove forming an annular structure having an outer surface and an inner surface and defining an original profile when new, comprising the steps of: removing a less-than-annular portion of the original profile of the groove to remove damaged portions of at least one of the inner and outer surfaces thereby forming a void; adding new material to the void; and shaping the new material to form a new profile of the groove.

DETAILED DESCRIPTION OF THE INVENTION

Figure 1:
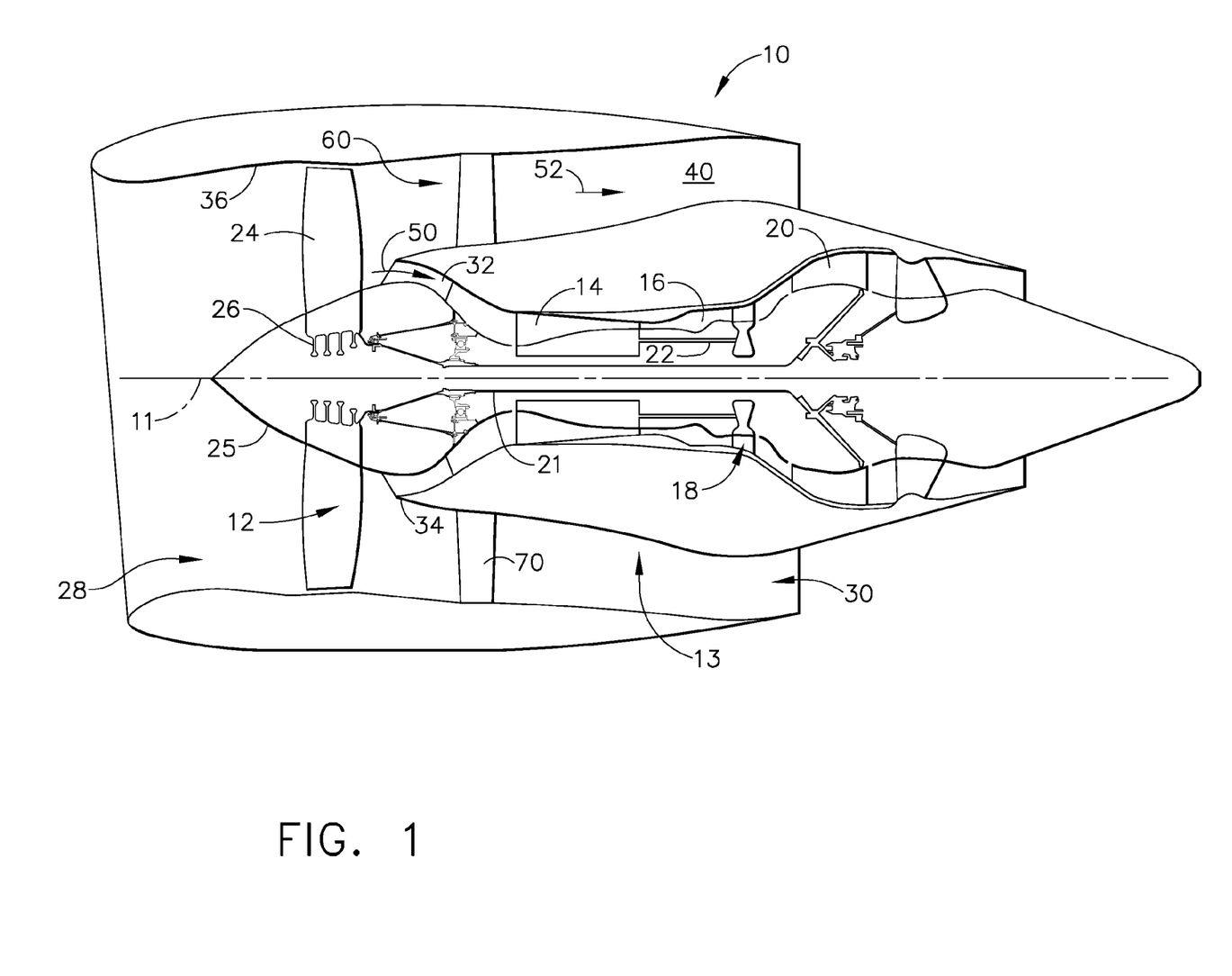
FIG. 1 is a cross-sectional illustration of an exemplary gas turbine engine assembly.

FIG. 1 is a cross-sectional schematic illustration of an exemplary gas turbine engine assembly 10 having a longitudinal axis 11. Gas turbine engine assembly 10 includes a fan assembly 12 and a core gas turbine engine 13. Core gas turbine engine 13 includes a high pressure compressor 14, a combustor 16, and a high pressure turbine 18. In the exemplary embodiment, gas turbine engine assembly 10 also includes a low pressure turbine 20, and a multi-stage booster compressor 32, and a splitter 34 that substantially circumscribes booster 32.

Fan assembly 12 includes an array of fan blades 24 extending radially outward from a rotor disk 26, the forward portion of which is enclosed by a streamlined spinner 25. Gas turbine engine assembly 10 has an intake side 28 and an exhaust side 30. Fan assembly 12, booster 22, and turbine 20 are coupled together by a first rotor shaft 11, and compressor 14 and turbine 18 are coupled together by a second rotor shaft 22.

In operation, air flows through fan assembly 12 and a first portion 50 of the airflow is channeled through booster 32. The compressed air that is discharged from booster 32 is channeled through compressor 14 wherein the airflow is further compressed and delivered to combustor 16. Hot products of combustion (not shown in FIG. 1) from combustor 16 are utilized to drive turbines 18 and 20, and turbine 20 is utilized to drive fan assembly 12 and booster 32 by way of shaft 21. Gas turbine engine assembly 10 is operable at a range of operating conditions between design operating conditions and off-design operating conditions.

A second portion 52 of the airflow discharged from fan assembly 12 is channeled through a bypass duct 40 to bypass a portion of the airflow from fan assembly 12 around core gas turbine engine 13. More specifically, bypass duct 40 extends between a fan casing or shroud 36 and splitter 34. Accordingly, a first portion 50 of the airflow from fan assembly 12 is channeled through booster 32 and then into compressor 14 as described above, and a second portion 52 of the airflow from fan assembly 12 is channeled through bypass duct 40 to provide thrust for an aircraft, for example. Splitter 34 divides the incoming airflow into first and second portions 50 and 52, respectively. Gas turbine engine assembly 10 also includes a fan frame assembly 60 to provide structural support for fan assembly 12 and is also utilized to couple fan assembly 12 to core gas turbine engine 13.

Fan frame assembly 60 includes a plurality of outlet guide vanes 70 that extend substantially radially between a radially outer mounting flange and a radially inner mounting flange and are circumferentially-spaced within bypass duct 40. Fan frame assembly 60 may also include a plurality of struts that are coupled between a radially outer mounting flange and a radially inner mounting flange. In one embodiment, fan frame assembly 60 is fabricated in arcuate segments in which flanges are coupled to outlet guide vanes 70 and struts. In one embodiment, outlet guide vanes and struts are coupled coaxially within bypass duct 40. Optionally, outlet guide vanes 70 may be coupled downstream from struts within bypass duct 40.

Fan frame assembly 60 is one of various frame and support assemblies of gas turbine engine assembly 10 that are used to facilitate maintaining an orientation of various components within gas turbine engine assembly 10. More specifically, such frame and support assemblies interconnect stationary components and provide rotor bearing supports. Fan frame assembly 60 is coupled downstream from fan assembly 12 within bypass duct 40 such that outlet guide vanes 70 and struts are circumferentially-spaced around the outlet of fan assembly 12 and extend across the airflow path discharged from fan assembly 12.

Figure 2:
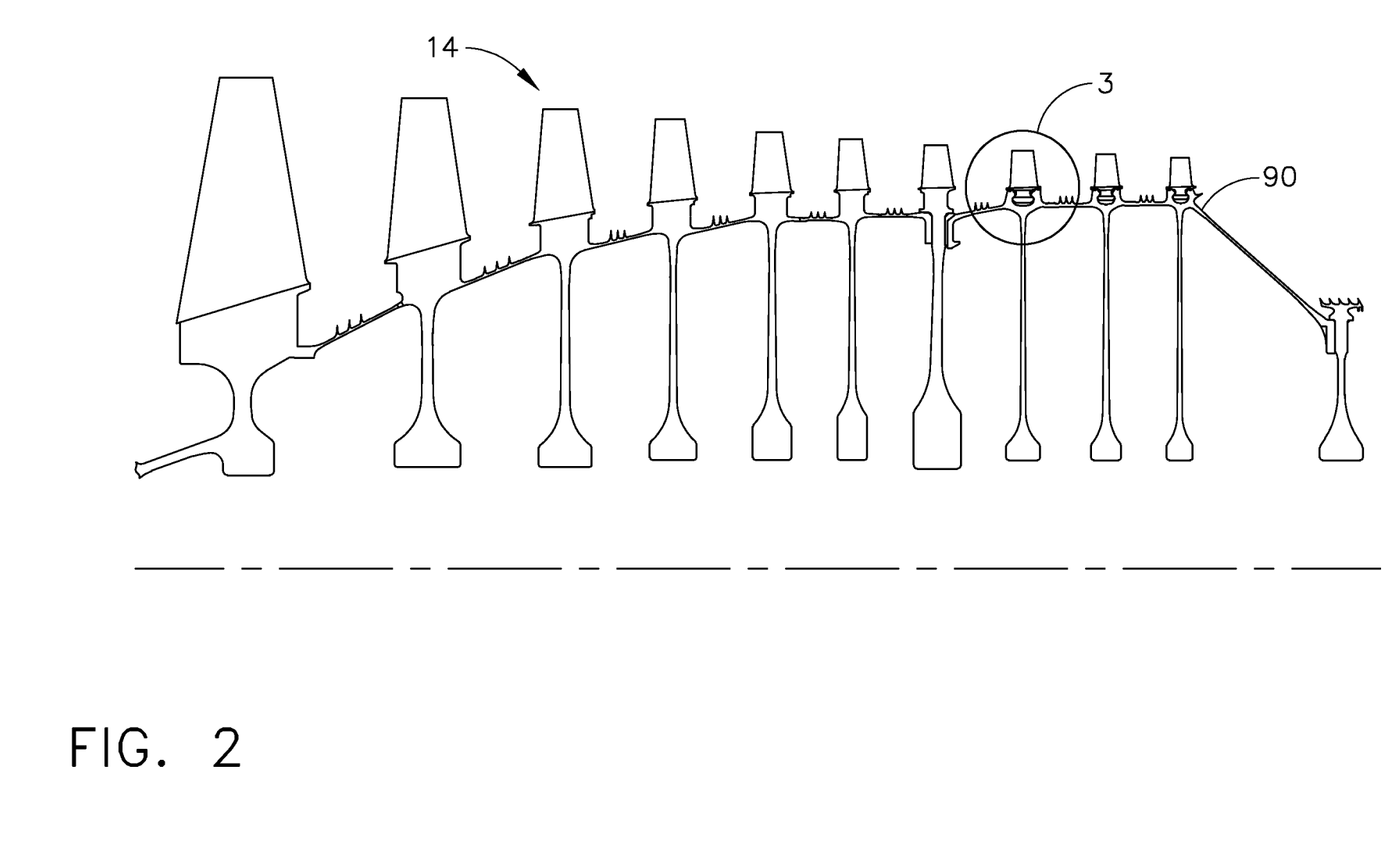
FIG. 2 is a cross-sectional elevational illustration of an exemplary compressor spool depicting a representative location for remaining illustrations.

FIG. 2 is a cross-sectional elevational illustration of an exemplary compressor spool 90 forming a part of the compressor 14 of FIG. 1, depicting a representative location identified with the circle and numeral 3 for the more detailed illustrations which follow.

Figure 3:
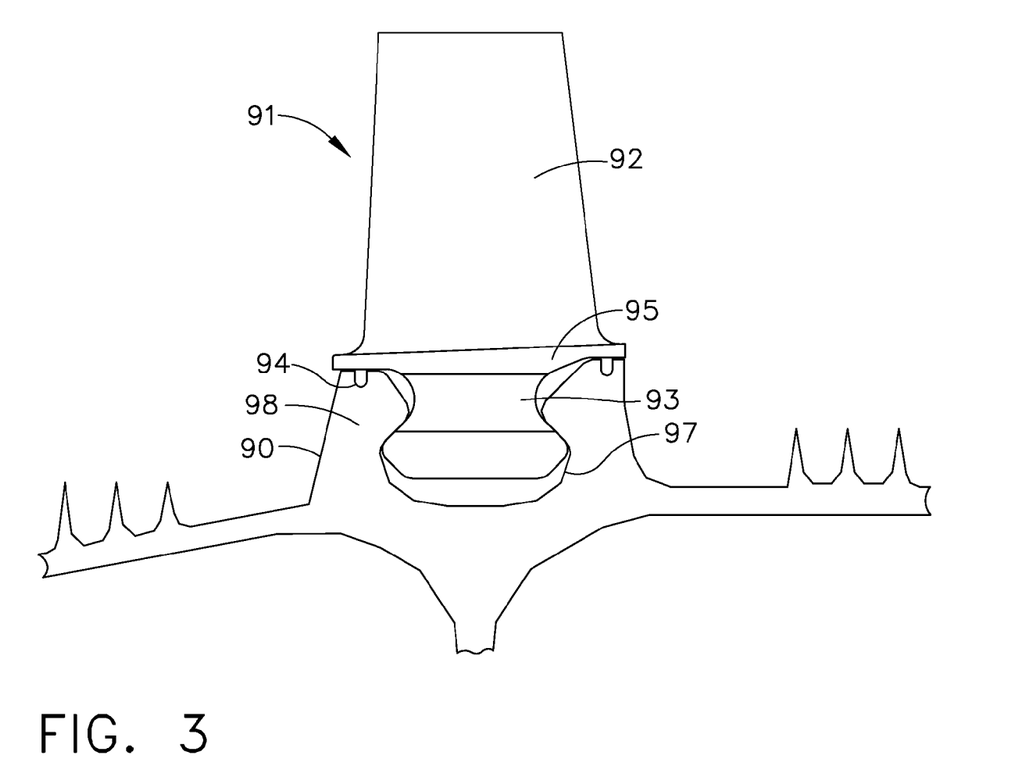
FIG. 3 is an enlarged partial elevational sectional illustration of a compressor blade mounted on a compressor spool.

FIG. 3 is an enlarged partial elevational sectional illustration of a compressor blade 91 mounted on a compressor spool 90. As shown in FIG. 3, the compressor blade 91 includes several elements such as an airfoil 92, a dovetail 93, and a platform 95 between the airfoil 92 and the dovetail 93. The dovetail 93 is sized and shaped to fit in dovetail slot 97 of compressor spool 90 to secure the blade 91 to the spool 90. The spool 90 and dovetail slot 97 are annular structures and a plurality of blades 91 are secured to the spool 90 around their circumference, though only a single blade 91 is illustrated for clarity. Also shown in FIG. 3 is a seal wire groove 94 for containing a seal wire 96 to form a seal between the platform 95 and the spool 90 to enhance efficiency of the compressor 14 in operation and thereby improve fuel consumption of the gas turbine engine assembly 10.

Figure 4:
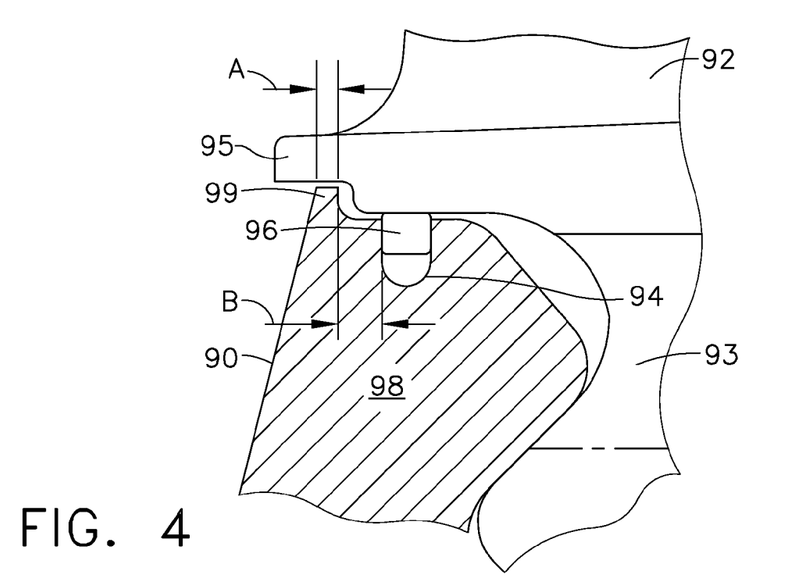
FIG. 4 is a more enlarged partial elevational sectional illustration depicting and defining relevant dimensions.

FIG. 4 is a more enlarged partial elevational sectional illustration of the elements of FIG. 3. As shown in FIG. 4, the seal wire groove 94 is spaced inwardly from the edge of the disk portion 98 of the compressor spool 90 by a dimension A which forms a shoulder 99 and a dimension B which forms a horizontal surface on the outer side of the groove 94. These shapes and dimensions are sized, shaped, and configured for the specific gas turbine engine assembly 10 for which they are intended, so the illustrations herein are intended to be illustrative and not limiting in terms of geometry. The platform 94 typically has a complementary shape to the radially-outer surfaces of the disk portion 98. As shown in FIG. 4, the seal wire 96 is located in the seal wire groove 94 and typically biased radially outwardly against the underside of the platform 94. The disk portion 98 may be formed from a metallic material, in which case the inner and outer surfaces of the groove 94 are formed of a metallic material. The seal wire 96 may also be formed of a metallic material and may be generally rectangular in cross section.

Figure 5:
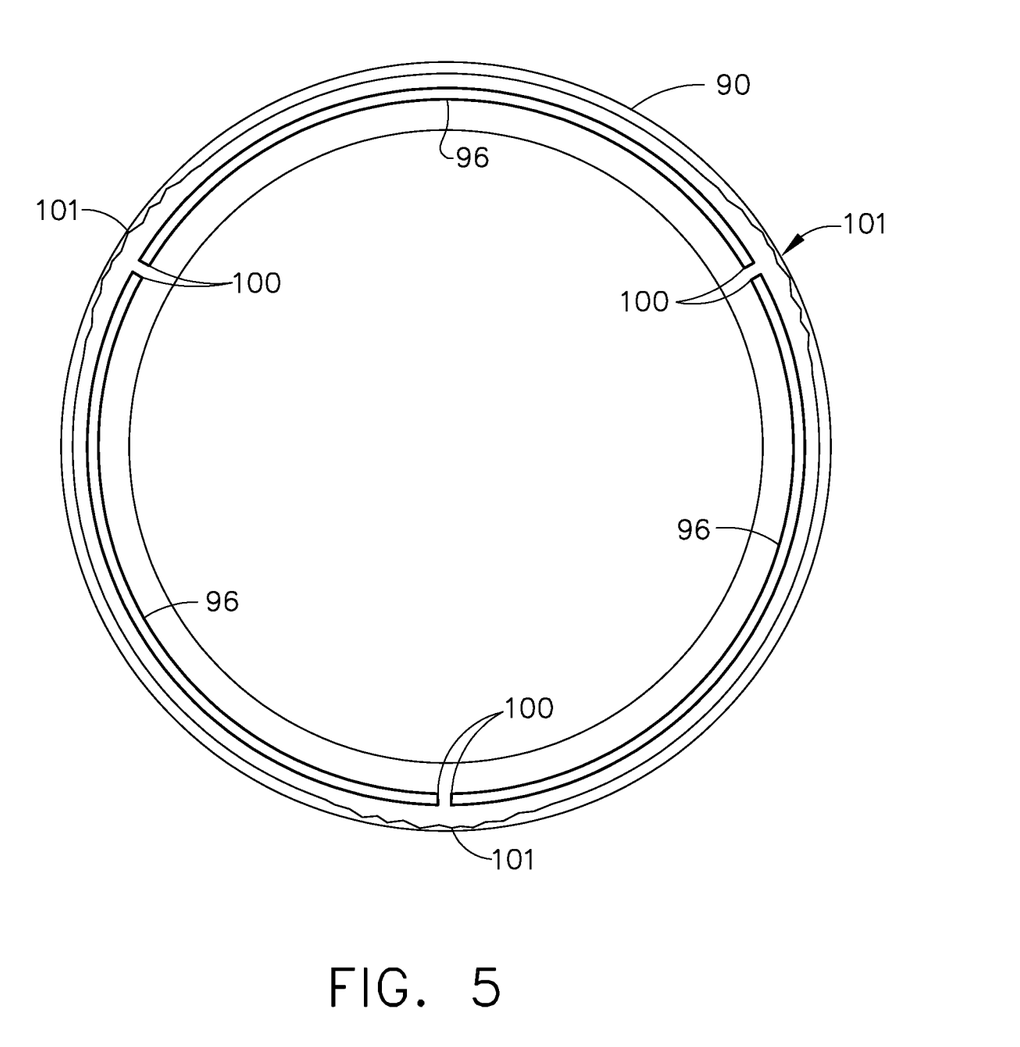
FIG. 5 is a cross-sectional illustration of a complete revolution of the compressor spool including seal wire sections installed.

FIG. 5 is a cross-sectional illustration of a complete revolution of the compressor spool 90 including sections of seal wire 96 installed in groove 94. The seal wire 96 will typically comprise multiple (more than one) pieces of material and thus have at least two ends 100, In the exemplary embodiment shown in FIG. 5, the seal wire 96 is formed in three (3) sections having six (6) ends labeled 100. Each of the ends 100 is a potential source for wear of the seal wire groove 94.

In service, the vibrations, pressures, and thermal effects experienced by the seal wire 96 often result in "fretting" wear to the surfaces of the groove 94 in the vicinity of the ends 100 due to their movement in various directions. This wear results in removal of material from the surfaces of the groove 94 such as depicted in wear zones 101 in FIG. 5, such that the grove 94 is enlarged in cross section and deviates from the original profile of the groove 94 When in a new condition. Wear may occur to the outer surface (proximal to the shoulder 99), to the opposing inner surface, or both. This results in a reduced sealing capability of the seal wire 96 and may also accelerate wear as the ends 100 of the seal wire have more freedom of movement as the degree of wear increases.

Figure 6:
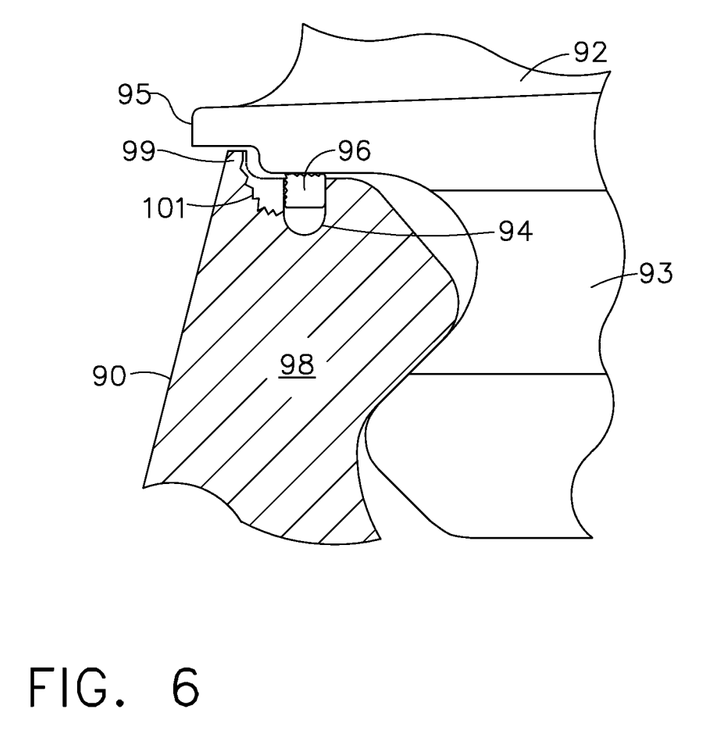
FIG. 6 is a view similar to FIG. 4 depicting fretting wear due to motion of the seal wire in service.

FIG. 6 is a view similar to FIG. 4 depicting fretting wear 101 due to motion of the ends 100 of the seal wire 96 in service. In contrast to the condition of the surfaces and elements depicted in FIG. 4, as shown in FIG. 6 portions of the groove 94 are worn away and enlarged such that the surfaces of the groove 94 are no longer consistent with the original profile of the groove 94 when it was in a like-new, as-manufactured condition. Surfaces of the seal wire 96 in this illustration are also shown as irregular and worn. Typically the condition of the seal wire 96 is of less concern than the condition of the groove 94 as the seal wire 96 is typically replaced with a new seal wire during repair while for economic reasons it is desirable to repair and restore the profile of the groove 94 and retain the disk portion 98 of the spool 90 for continued service.

Figure 7:
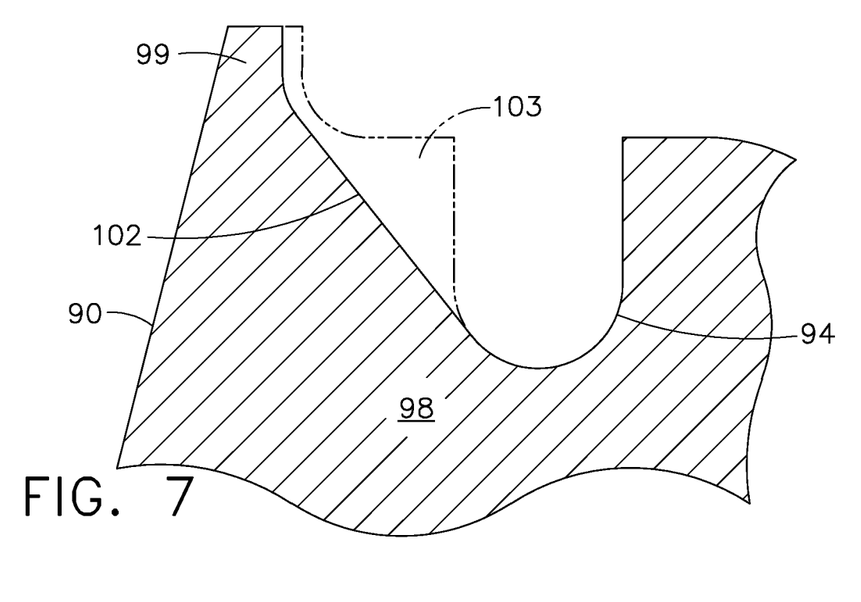
FIG. 7 is a view similar to FIG. 6 depicting a portion of the compressor spool after material removal of the damaged portion.

FIG. 7 is a view similar to FIG. 6 depicting a portion of the compressor spool 90 after material removal of the damaged portion in the wear zone 101. Material removal of the worn, irregular, soiled, or otherwise deteriorated portion of the surfaces groove 94 is the first step in the method of repairing the groove 94. This removal results in a void having a new profile 102 which differs from the original profile 103 (shown in dotted line in FIG. 7), and has surfaces which are relatively solid, smooth, and of uniform character. In the exemplary embodiment shown, the repair method is being accomplished on the outer surface (proximal to shoulder 99) of the groove 94, although it could be equally applied to the opposing inner surface, or to both surfaces. Material removal to generate the new profile 102 may be accomplished by mechanical means, such as machining by rotary tools such as a saw blade or abrasive disk, or other means such as chemical or electrical machining processes, and may be done in one pass or in multiple steps or stages. A tool with an appropriate profile may be used, or a tool with a generic profile which is controlled in such a manner as to generate the proper profile may be used.

Figure 8:
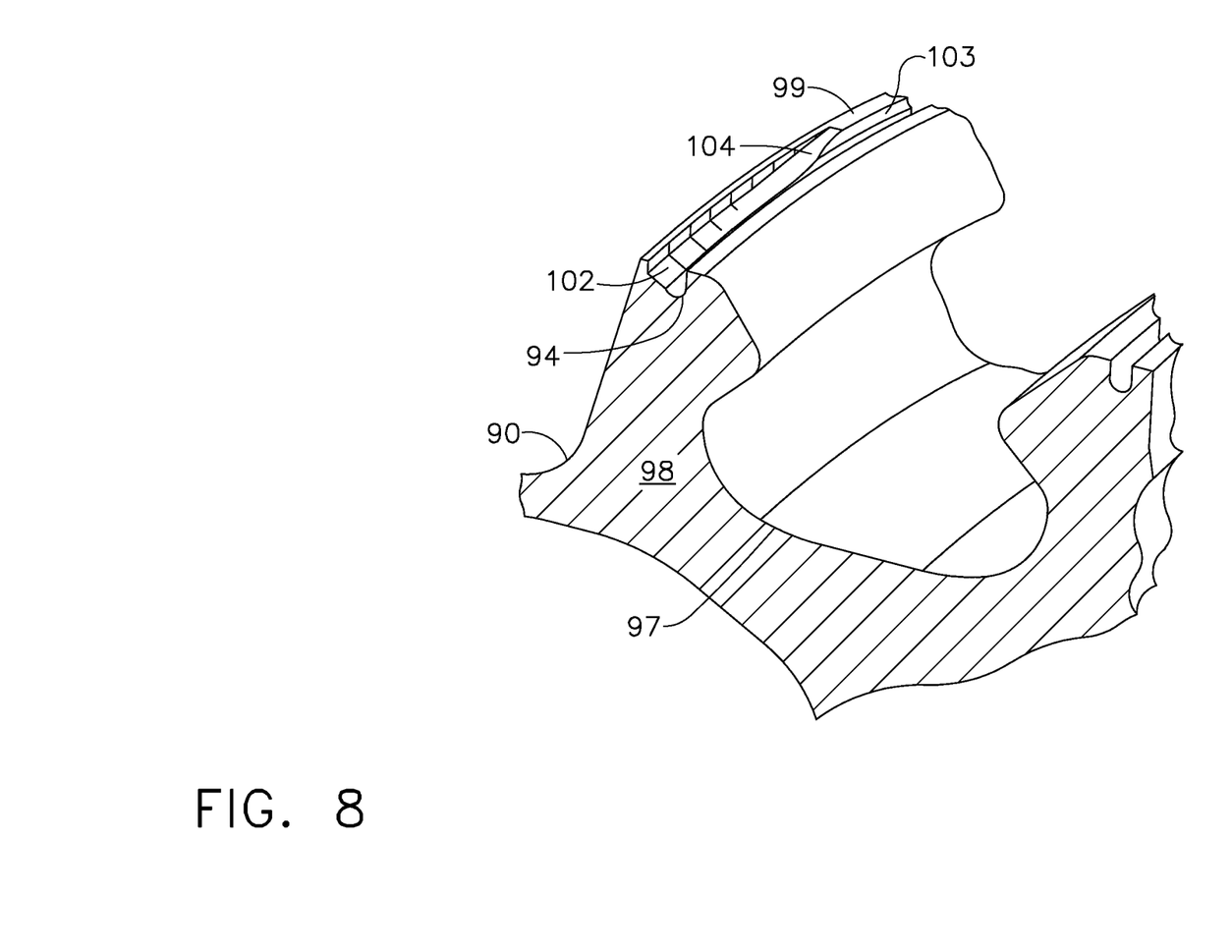
FIG. 8 is a perspective view of the portion of the compressor spool of FIG. 7 taken through an intermediate station of the material removal to illustrate the end of the removal.

FIG. 8 is a perspective view of the portion of the disk portion 98 of the compressor spool 90 of FIG. 7 taken through an intermediate station of the material removal section (new profile 102) to illustrate the end 104 of the removal. Because the material removal occurs over a less-than-annular portion or segment of the annular disk 98, it by definition forms a void having at least two ends 104 for each material removal and defines a localized repair area. It is believed that these ends 104, being defined by remaining portions of original material of the disk 98, provide stability and support for the new material to be added to restore the original profile 103 of the groove 94. The lead in angle and radius characteristics of the ends 104, such as an exit radius, may be determined with both the tooling and techniques used for the material removal, as well as the adhesion and minimum thickness requirements for the new material to be added. Repairs made with new material which is too thin in cross section or comparatively lower adhesion characteristics may tend to spall during engine operation.

Figure 9:
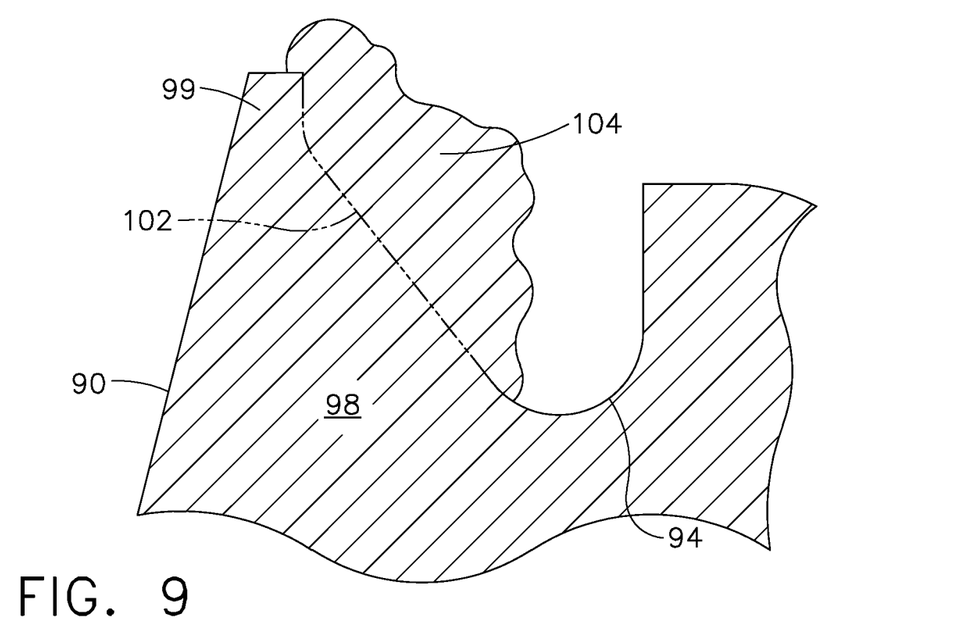
FIG. 9 is a view similar to FIG. 7 after new repair material has been added.

FIG. 9 is a view similar to FIG. 7 after new repair material 104 has been added to build back material equal to or greater than the original profile 103 of the groove 94. Said differently, new material is added in excess of the volume of the void. The addition of new material can be accomplished by any suitable method or apparatus depending upon the quantity and type of material to be added and upon the size, shape, and material from which the disk 98 is constructed.

Metal Thermal Spray is one category of suitable material addition processes. In an exemplary embodiment, the material addition may be Inco 718 material being sprayed using the Hyper-Velocity Oxy-Fuel (HVOF) process, Various metals can be applied using this method, not just Inco 718. Other metal spray processes such as Plasma spray may also be utilized. Representative processes involve spraying molten metal through a nozzle at the target area of the part being repaired and building up the material in the seal wire groove 94 to achieve a condition such as shown in FIG. 9. The HVOF process has been found to exhibit a lesser amount of voiding and is easier to machine to the desired finished profile than some other potential processes. It has also been found to do a minimal amount of parent material damage (i.e., to the disk material at or below the removal profile 102) because it maintains the repair area parent material temperatures below solution or melting. With certain other processes such as a typical weld process, it could heat the area to a point that could alter the metal grain structure or cause micro cracking.

Figure 10:
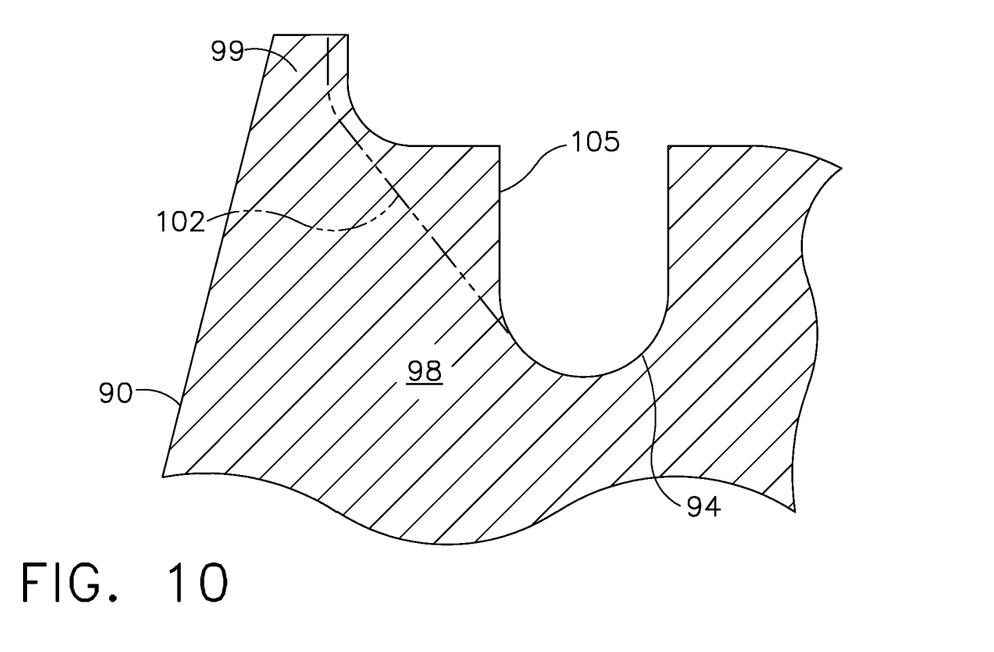
FIG. 10 is a view similar to FIG. 9 after the new repair material of FIG. 9 has been machined to the correct profile.

FIG. 10 is a view similar to FIG. 9 of the disk 98 after the new repair material 104 of FIG. 9 has been shaped, such as by machining, to the proper finished profile 105. The new finished profile 105 will typically be the same as or substantially similar to the original as-manufactured profile 103 shown in FIGS. 7 and 8. However, under certain circumstances the new profile 105 could differ particularly if a replacement seal wire 96 having a different geometry were to be used. In such a scenario, the remaining portions of the circumference of the seal wire groove 94 may or may not be machined to match the new profile 105.

Material removal or shaping of the newly-added repair material to generate the finished profile 105 may be accomplished by mechanical means, such as machining by rotary tools such as a saw blade or abrasive disk, or other means such as chemical or electrical machining processes, and may be done in one pass or in multiple steps or stages. A tool with an appropriate profile may be used, or a tool with a generic profile which is controlled in such a manner as to generate the proper profile may be used.

The steps described above may be repeated multiple times at different annular stations around the groove, and performed either simultaneously or sequentially.

While much of the discussion has focused on an aviation gas turbine engine as the context for this repair, it is foreseeable that such methods may be suitable for use in other environments wherein a wire-type seal is used with a complementary groove and rejuvenation is required, such as steam turbines or other turbomachinery.

While the invention has been described in terms of various specific embodiments, those skilled in the art will recognize that the invention can be practiced with modification within the spirit and scope of the claims.

What is claimed is:

1. A method of repairing a seal wire groove, said groove forming an annular structure having an outer surface and an inner surface and defining an original profile when new, said method comprising the steps of:
   removing a less-than-annular portion of said original profile of said groove to remove damaged portions of at least one of said inner and outer surfaces thereby forming a void;
   adding new material to said void; and
   shaping said new material to form a new profile of said for containing a seal wire.

2. A method in accordance with claim 1, wherein said new profile is substantially similar to said original profile.

3. A method in accordance with claim 1, wherein said new material is added in excess of the volume of said void.

4. A method in accordance with claim 1, wherein said steps are repeated multiple times at different annular stations around said groove.

5. A method in accordance with claim 1, wherein said step of adding new material is performed via a metal thermal spray process.

6. A method in accordance with claim 1, wherein said step of adding new material is performed via a Hyper-Velocity Oxy-Fuel (HVOF) process.

7. A method in accordance with claim 1, wherein said removing step is performed by machining.

8. A method in accordance with claim 1, wherein said shaping step is formed by machining.

9. A method in accordance with claim 1, where said groove is formed in a gas turbine engine compressor disk.

10. A method in accordance with claim 1, wherein said inner and outer surfaces of said groove are formed of a metallic material.

11. A method in accordance with claim 1, wherein said new material is a metallic material.

12. A method in accordance with claim 1, wherein said new material is Inco 718.

13. A method in accordance with claim 1, wherein said shaping step is performed using a profiled machining tool.

14. A method in accordance claim 1, wherein said removing step creates at least two ends in said less-than-annular portion.

15. A method in accordance with claim 1, wherein said removing step removes three less-than-annular portions of said groove.

16. A method in accordance with claim 1, wherein said groove is configured to accommodate a seal wire of generally rectangular cross section.

17. A method in accordance with claim 1, further comprising the step of installing at least one seal wire after said shaping step.

18. A method in accordance with claim 1, wherein said void defines a localized repair area.

19. A method in accordance with claim 1, wherein said shaping step is performed in a single pass.

20. A method of repairing a seal wire groove in a gas turbine engine compressor disk, said groove forming an annular structure having an outer surface and an inner surface and defining an original profile when new configured to accommodate a seal wire of generally rectangular cross section, said method comprising the steps of:
   removing a less-than-annular portion of said original profile of said groove via mechanical machining to remove damaged portions of at least one of said inner and outer surfaces thereby forming a void defining a localized repair area;
   adding new material to said void via a Hyper-Velocity Oxy-Fuel (HVOF) process; and
   shaping said new material via mechanical machining to form a new profile of said for containing a seal wire.
   wherein said new profile is substantially similar to said original profile.

* * * * *

UNITED STATES PATENT AND TRADEMARK OFFICE
CERTIFICATE OF CORRECTION

Page 1 of 1

PATENT NO. : 8,893,381 B2
APPLICATION NO. : 13/334746
DATED : November 25, 2014
INVENTOR(S) : Noe et al.

It is certified that error appears in the above-identified patent and that said Letters Patent is hereby corrected as shown below:

In the Specification

In Column 1, Line 13, delete "generally" and insert -- generally to --, therefor.

In Column 1, Line 32, delete "circumference." and insert -- circumference, --, therefor.

In Column 1, Line 36, delete "arrangement," and insert -- arrangement. --, therefor.

In Column 3, Line 62, delete "100," and insert -- 100. --, therefor.

In Column 4, Line 6, delete "94 When" and insert -- 94 when --, therefor.

In Column 5, Line 11, delete "process," and insert -- process. --, therefor.

In the Claims

In Column 6, Line 20, in Claim 8, delete "formed" and insert -- performed --, therefor.

In Column 6, Line 21, in Claim 9, delete "where" and insert -- wherein --, therefor.

In Column 6, Line 32, in Claim 14, delete "accordance" and insert -- accordance with --, therefor.

In Column 6, Line 62, in Claim 20, delete "wire." and insert -- wire; --, therefor.

Signed and Sealed this
Seventh Day of July, 2015

Michelle K. Lee
*Director of the United States Patent and Trademark Office*